United States Patent [19]

Malvar

[11] Patent Number: 4,754,492
[45] Date of Patent: Jun. 28, 1988

[54] METHOD AND SYSTEM FOR ADAPTING A DIGITIZED SIGNAL PROCESSING SYSTEM FOR BLOCK PROCESSING WITH MINIMAL BLOCKING ARTIFACTS

[75] Inventor: Henrique S. Malvar, Cambridge, Mass.

[73] Assignee: PictureTel Corporation, Peabody, Mass.

[21] Appl. No.: 740,806

[22] Filed: Jun. 3, 1985

[51] Int. Cl.$^4$ .............................................. G06K 9/36
[52] U.S. Cl. ..................................... 382/41; 358/133; 358/260; 382/54; 382/56
[58] Field of Search ....................... 382/41, 47, 54, 56; 358/22, 133, 135, 183, 260; 364/725, 726, 826, 827

[56] References Cited

U.S. PATENT DOCUMENTS

| | | | |
|---|---|---|---|
| 4,027,257 | 5/1977 | Perreault | 364/827 |
| 4,224,678 | 9/1980 | Lynch et al. | 358/133 |
| 4,245,248 | 1/1981 | Netravali et al. | 358/136 |
| 4,261,018 | 4/1981 | Knowlton | 358/133 |
| 4,261,043 | 4/1981 | Robinson et al. | 358/133 |
| 4,281,344 | 7/1981 | Mounts et al. | 358/136 |
| 4,288,858 | 9/1981 | Merola et al. | 364/826 |
| 4,302,775 | 11/1981 | Widergren et al. | 358/136 |
| 4,394,774 | 7/1983 | Widergren et al. | 382/56 |
| 4,447,886 | 5/1984 | Meeker | 364/725 |
| 4,580,158 | 4/1986 | Macheboeuf | 358/183 |
| 4,602,286 | 7/1986 | Kellar et al. | 358/22 |
| 4,616,262 | 10/1986 | Toriumi et al. | 358/22 |

OTHER PUBLICATIONS

Clarke, "Transform Coding of Images", pp. 72–77, 1985.
Jain et al., "Displacement Measurement and Its Application in Interframe Image Coding," IEEE Transactions on Communications, vol. COM-29, No. 12, Dec. 1981, pp. 1799–1808.
Koga et al., "Motion-Compensated Interframe Coding for Video Conferencing", CH1679-0/81/000-0312, 1981 IEEE, G5.3.1–G5.3.5.
Ericsson, "Motion-Compensation Hybrid Coding at 50 Kb/s," CH2118-8/85/0000-0367, 1985 IEEE, 10.8.1–10.8.8, pp. 367–370.
Reeve III et al., "Reduction of Blocking Effect in Image Coding," CH1841-6/83/0000-1212, ICASSP 83, Boston, pp. 1212–1215 (1983).
GTE Advertisement, "The Uses of Silence," *Technology Review*, Aug./Sep., 1984, pp. 64–65.
Hinman et al., "Short-Space Fourier Transform Image Processing", Massachusetts Institute of Technology, Research Laboratory of Electronics, Cambridge, Massachusetts, (Published prior to June, 1984, exact date unknown).

*Primary Examiner*—Leo H. Boudreau
*Assistant Examiner*—Joseph Mancuso
*Attorney, Agent, or Firm*—Lahive & Cockfield

[57] ABSTRACT

A method and apparatus for processing n-dimensional digitized signals containing at least two adjacent blocks of digitized sample values. The digitized signal is transformed in accordance with a spatial transform operator. The spatial transform operator is characterized by similar size blocks to the blocks in the input signal, but is operative over blocks of the signal which extend beyond the nominal blocks in the signal by a predetermined number of sample values in at least one dimension. The resultant signal may be similarly transformed by another spatial transform operator to obtain an output transform signal. The latter signal is substantially free from blocking artifacts.

102 Claims, 6 Drawing Sheets

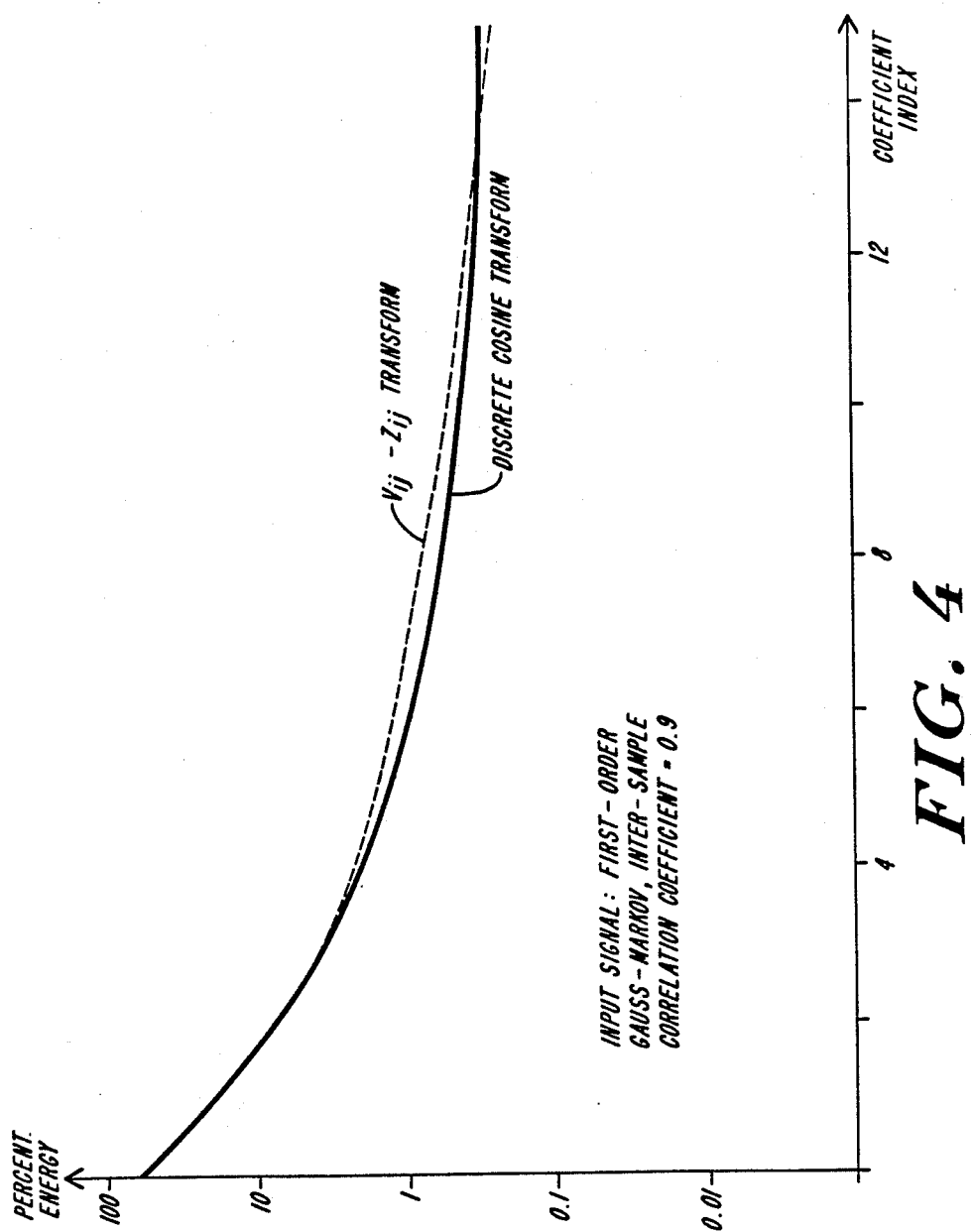

METHOD AND SYSTEM FOR ADAPTING A DIGITIZED SIGNAL PROCESSING SYSTEM FOR BLOCK PROCESSING WITH MINIMAL BLOCKING ARTIFACTS

REFERENCE TO RELATED APPLICATION

The subject matter of this application is related to that of U.S. patent application Ser. No. 713,478, entitled Method and Apparatus for Multi-Dimensional Signal Processing Using a Short Space Fourier Transform, filed Mar. 19, 1985.

BACKGROUND OF THE DISCLOSURE

The invention relates generally to a multi-dimensional signal processing method and apparatus, and in particular to a method and apparatus useful for processing multi-dimensional signals, such as two-dimensional pictorial images.

The invention is particularly pertinent to the field of image data processing and compression. Image data compression is a process which allows images to be transmitted in coded form over a communications channel using fewer bits of data than required to transmit an uncoded image. By reducing the quantity of data that is transmitted, the received picture is generally degraded in quality from the original. The goal of a particular image data compression method and apparatus is to minimize the amount of degradation that occurs for a given data rate.

One well known compression technique is transform coding. This method involves taking a transformation of the image data to provide a sequence of coefficients which can be encoded using, for example, a non-equal number of bits for each resulting coefficient. In particular, the number of bits employed is based upon the logarithm of the variance for a particular coefficient. At the receiver, the coded coefficient data is employed for reconstructing the coefficient values and performing the inverse of the original transform to obtain an image representative of the original data.

One form of transform coding, block image coding, is often used to accommodate localized variations in image characteristics. With block image coding, a digitized function (here referred to as an "image") is decomposed into small rectangular regions (or "blocks") which are transform coded and transmitted through a communications channel (generally a digital channel). At the receiver, the blocks are decoded and re-assembled in order to reconstruct the image. In a typical situation, an image composed of an array of 256×256 picture elements (pixels) can be viewed as an array of 16×16 blocks, where each block contains 16×16 pixels.

There are several reasons for breaking up the image into blocks before coding, among them, considerations of the amount of data to be processed by the coder at each time, and the possibility of adapting the coder to the particular characteristics of each block. When the coder is designed on the basis of an efficient algorithm, block image coding is one of the best techniques to achieve significant data compression factors for a given picture quality.

One of the most efficient ways to code each block is to apply the Discrete Cosine Transform (DCT) to the block, followed by some adaptive quantization scheme. The DCT is a linear transformation that generates a new block of pixels, with each new pixel being a linear combination of all the incoming pixels of the original block. What distinguishes one linear transform from the others is the set of coefficients used in the linear combinations that define each transformed pixel. The particular set used in the DCT has the property of approximating closely what would be an statistically-optimal set, and at the same time leading to a fast computation algorithm. The "almost-optimality" of the DCT implies that the degree of data compression obtained is very close to the theoretical maximum that can be achieved for any given reconstruction-error level.

The major disadvantage of block image coding is that the image is degraded by the coding process and the boundaries of the reconstructed blocks can be clearly visible in the resulting received image. In particular, this occurs because in accordance with prior art block transform coding techniques, the quantization noise is generally correlated within blocks but is independent between blocks, yielding mismatches at block boundaries. Because of these blocking artifacts, coded images appear to be composed of "tiles".

Generally, when the amount of data compression in a block coded image is enough to produce significant errors inside the blocks, the blocking artifacts cause the block boundaries to become highly visible. This blocking effect is very annoying because the eye is quite sensitive to mismatches across the block boundaries. With the increasing interest on image coders for very low data rates for video teleconferencing applications, it is important to minimize the blocking effects.

Several techniques have been described in the prior art for reducing blocking effects. One approach is to overlap the blocks slightly, by one pixel for example, and reconstruct the overlapping regions at the receiver by using the average of the reconstructed pixels from each of the overlapping blocks. This method leads to an overhead in the amount of data to be transmitted, since the blocks have to be larger.

Another technique, which does not require any additional data to be transmitted, is to use a spatially-variant low-pass filter that blurs the image in the block boundary regions. Although the latter technique is very effective in reducing the blocking effects, image details which happen to be on block boundaries are also blurred, with a perceptible loss in sharpness.

Another approach is to use the Short-Space Fourier Transform, generally referred to as the SSFT, as described in U.S. patent application Ser. No. 713,478. The SSFT is an extension of the Short-Time Fourier Transform (STFT) for two-dimensional signals. Like the STFT, the SSFT breaks up the signal into blocks, but the recovery process is such that no discontinuities are introduced in the reconstructed signal. Thus, the SSFT is intrinsically free from discontinuity blocking effects. However, another artifact, in the form of ringing in the neighborhood of edges, may be introduced. Computationally, the SSFT is less efficient than the DCT or other "fact" transforms.

It is an object of the present invention to provide an improved apparatus and method for transforming an n-dimensional function.

Another object is to provide an improved method and apparatus for processing an n-dimensional digitized signal with minimal blocking artifacts.

SUMMARY OF THE INVENTION

Briefly, the invention is a system and method for processing an n-dimensional digitized signal containing at least two $M_1 \times M_2 \times \ldots \times M_n$ blocks of digitized sample values, where $M_1, M_2, \ldots, M_n$ are integers respectively associated with one of the n dimensions.

In one form of the invention, the digitized signal is first transformed in accordance with a first spatial transform operator to obtain a first transformed signal. The first transformed signal differs from the digitized signal at corresponding sample values contiguous to and including the boundaries to adjacent blocks, and those signals are substantially the same otherwise. The first transformed signal is then transformed in accordance with a second spatial transform operator to obtain an output transformed signal. The output transformed signal substantially corresponds to said digitized signal, with the second spatial transform operator being substantially the inverse of the first spatial transform. Prior to the second transformation, the first transformed signal may be block processed in accordance with a block process characterized by $M_1 \times M_2 \times \ldots \times M_n$ blocks, thereby providing a block processed signal.

In another form of the invention, the digitized signal is first transformed in accordance with a first spatial transform opertor to obtain a first transformed signal, where the first spatial transform operator is chracterized by $M_1 \times M_2 \times \ldots \times M_n$ basis functions, and where the first spatial transform opertor is operative over an n-dimensional peripheral annulus of $(M_1 + 2K_1) \times (M_2 + 2K_2) \times \ldots \times (M_n + 2K_n)$ blocks of the sample values of the digitized signal, where $K_1, K_2, \ldots, K_n$ are non-negative integers, and at least one of $K_1, K_2, \ldots, K_n$ is non-zero. The first transformed signal is then transformed in accordance with a second spatial transform operator to obtain an output transformed signal. The output transformed signal substantially corresponds to the digitized signal, and with the second spatial transform operator being substantially the inverse of the first spatial transform.

Prior to the second transformation, the first transformed signal may be transformed in accordance with a block processing operator characterized by $M_1 \times M_2 \times \ldots \times M_n$ blocks, thereby providing a block processed signal.

In keeping with another form of the invention, a digitized signal is transformed in accordance with a composite spatial operator to obtain a first transformed signal. The composite spatial operator, in effect, comprises a first spatial transform operator and a block processing operator.

The first spatial transform operator is characterized by $M_1 \times M_2 \times \ldots \times M_n$ basis functions. That operator is operative over an n-dimensional peripheral annulus of $(M_1 + 2K_1) \times (M_2 + 2K_2) \times \ldots \times (M_n + 2K_n)$ blocks of sample value of the digitized signals, where $K_1, K_2, \ldots, K_n$ are non-negative integers, where at least one of those K values is non-zero. The block processing operator is characterized by $M_1 \times M_2 \times \ldots \times M_n$ blocks, and by $M_1 \times M_2 \times \ldots \times M_n$ basis functions. The block processing operator is operative over $M_1 \times M_2 \times \ldots \times M_n$ blocks of the sample values generated by the first spatial transform operator.

In various forms of the invention, the first transformed signal is transformed in accordance with the second composite spatial operator to obtain an output transformed signal. The second transform operator is a block processing operator similarly characterized by $M_1 \times M_2 \times \ldots \times M_n$ blocks. In some forms of the invention, the output transformed signal substantially corresponds to the digitized signal, for example, in an image transmission system. In this case, the first and second composite spatial operators are the inverse of each other. Generally speaking, the first and second composite spatial operators are non-orthogonal.

The first and second composite spatial operators may comprise, as one portion thereof, discrete cosine transform operators and inverse discrete cosine transform operators, respectively.

In one form of the invention, the first composite spatial operator has the form of the product of a window function and a modified discrete cosine transform operator. The modified discrete cosine transform operator is characterized by $M_1 \times M_2 \times \ldots \times M_n$ basis functions operative over a $(M_1 + 2K_1) \times (M_2 + 2K_2) \times \ldots \times (M_n + 2K_n)$ blocks of sample values in the digital signal. The window function is an n-dimensional sequence which is symmetrical in each of the n-dimensions. For each sample value in a block, the sum of the window function for that sample value in that block and the window functions for that sample value in all blocks adjacent to that block is a predetermined value, for example, unity. Further, the rate of change of the window function in each dimension may be relatively smooth near the block boundaries.

In various forms of the invention, the first spatial transform operator effectively modifies sample, values of the digitized signal by replacing selected sample values in the blocks with modified sample values. The modified values correspond to combinations of pairs of associated sample values symmetrically disposed about the boundaries between adjacent blocks of the digitized signal. The combinations may be weighted linear combinations of such sample values. In the preferred form, the distribution of weighting coefficients of those combinations for a block is symmetrical across the block. Further, for each modified sample value in a block, the sum of the weighting coefficient for that sample value in that block and the weighting coefficients for that sample value in all blocks adjacent to that block is a predetermined value.

With the present invention, one can attenuate the blocking effect to unperceivable levels, with little computational overhead (typically, on the order of 10%).

BRIEF DESCRIPTION OF THE DRAWING

The foregoing and other objects of this invention, the various features thereof, as well as the invention itself, may be more fully understood from the following description, when read together with the accompanying drawings in which:

FIG. 4 illustrates a comparison of the energy distribution in the transform domain of the Direct Cosine Transform and the one dimensional $v_{ij} - z_{ij}$ Transform of the present invention;

DESCRIPTION OF THE PREFERRED EMBODIMENT

Figure 1:
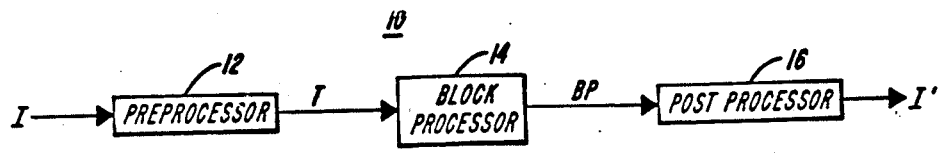
FIG. 1 shows, in block diagram form, an exemplary embodiment of the invention.

FIG. 1 shows a system 10 exemplifying the present invention. System 10 includes a preprocessor 12 coupled to a block processor 14 which in turn is coupled to a post processor 16. In operation, an input signal I is applied to preprocessor 12 to generate a first signal T. Block processor 14 processes the signal T to provide a block processed signal BP. Postprocessor 16 processes that signal BP to an output image signal I'. In various forms of the invention, any type of block processing may be used in processor 14. In embodiments adapted for image transmission, where the input signal I is representative of an image, the signal I' substantially matches the input signal I, with minimal blocking artifacts. In other embodiments, for example, where the block processor performs a block filtering function, the signal I' is representative of the filtered signal I, again with minimal blocking artifacts.

Figure 2:
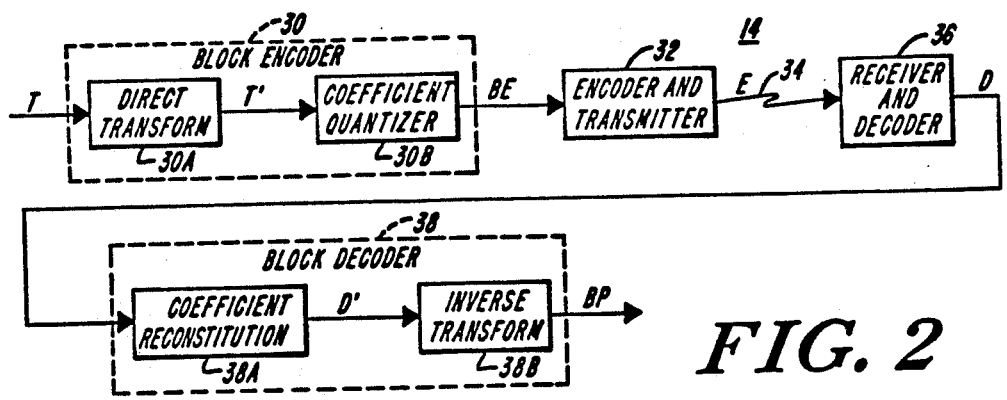
FIG. 2 shows, in block diagram form, the block processor of the embodiment of FIG. 1.

FIG. 2 illustrates one particular form of processor 14 in which the input signal T is initially transformed by preprocessor 12 and a block encoder 30 to provide a block encoded signal BE. Encoder and transmitter 32 encodes the signal BE in a form suitable for transmission and then transmits that encoded signal E over a communications medium (shown in FIG. 2 by arrow 34) to a receiver and decoder 36. The reciever and decoder 36 receives and decodes the signal E to provide a decoded signal D for application to a block decoder 38. Decoder 38 and postprocessor 16 transforms signal D to the block processed signal BP.

By way of example, elements 30 and 38 may be conventional-type discrete cosine transform (DCT) and inverse discrete cosine transform (IDCT) processors, where block encoder 30 includes a direct transform element 30A coupled to a coefficient quantizer element 30B, and where block decoder 38 includes a coefficient reconstructor element 38A and inverse transform element 38B. Blocks 32 and 36 may comprise a conventional-type configuration of data encoders, modulators, demodulators and decoders. The block processor 14 performs an efficient compression, transmission, and then reconstruction of the signal T over the communications medium so that the block processed signal BP should match (or be a filtered version of) the transform signal T. However, in practice, as described above, the block processor 14 may potentially introduce blocking artifacts which are undersirable. In the present invention, preprocessor 12 and postprocessor 16 are used in conjunction with block processor 14 to effectively provide signal I' which is substantially free of the blocking artifacts which might otherwise be introduced by block processor 14.

Figure 3:
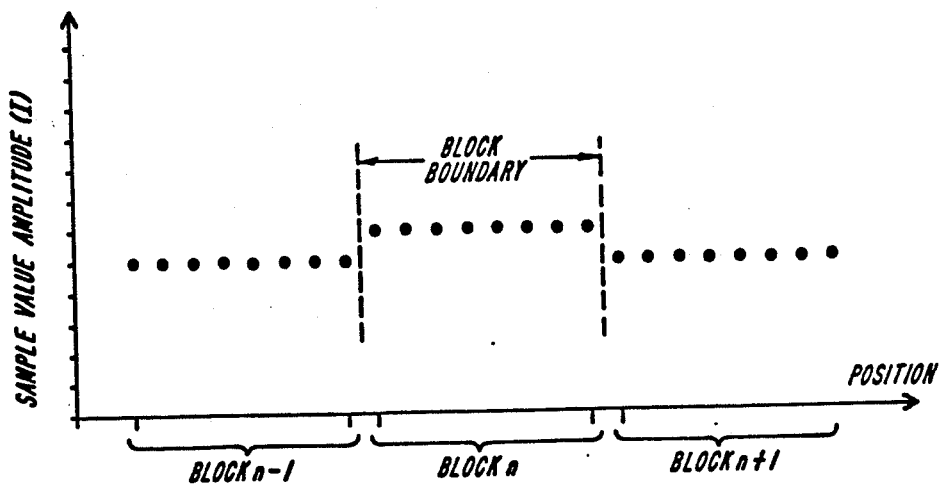
FIG. 3 illustrates an exemplary input signal for the system of FIGS. 1 and 2.

By way of example, for the system of FIGS. 1 and 2, the input signal I may be a one or two dimensional signal. In the event the block processor 14 is based on the use of the discrete cosine transform (DCT) in element 30A followed by the use of the inverse discrete cosine transform (IDCT) in element 38B, as in the presently described exemplary configuration, and that configuration was used in accordance with the prior art there would be significant blocking artifacts in signal BP. Such blocking effects would be principally due to the fact that the basis functions for the DCT do not approach zero at the block boundaries. Therefore, when the reconstruction is carried out, small errors in the transform coefficients would lead to discontunities in the reconstructed signal. This blocking effect is illustrated in FIG. 3 for a one dimensional slice across three blocks of an exemplary image. However, in accordance with the present invention, blocking artifacts are eliminated through the use of preprocessor 12 and postprocessor 16 in conjunction with block processor 14.

In one form of the system of FIG. 1, the preprocessor 12/element 30A combination and the element 38B/postprocessor 16 combination perform transforms on their respective input signals which are similar in part to the DCT/IDCT processes. Those combinations each perform as composite spatial operators, each including, in effect, performing as a spatial transform operator and a block processing operator. More particularly, the composite operators are employed which utilize basis functions similar to conventional DCT/IDCT basis functions but which are characterized by slight extensions into the neighboring blocks in the input signal. After extension, the resulting basis functions are multiplied by a window that ensures smoothness across block boundaries.

The basis functions for the direct transform for the preprocessor 12/element 30A combination is determined through the following steps:

1. Extend the basis functions of the DCT to K additional input signal sample values in each direction for each dimension, by letting the indices in the DCT definition run through the additional 2K values.

2. Multiply the new set of extended functions by an associated window function.

The basis functions for the inverse transform for the element 38/postprocessor 16 combination are is similarly determined. The use of the DCT/IDCT as a foundation for these transform operators is merely exemplary and, alternatively, another set of basis functions could be used instead of those from the DCT/IDCT. However, since the DCT/IDCT is fast-computable and is almost optimal in a statistical sense, it is used in the presently described embodiment. This exemplary DCT/IDCT embodiment will now be described for one dimensional input signal I.

The DCT basis functions for an $1 \times M$ block are $$q_{ij} = c(j)\cos\left[\frac{(2i-1)(j-1)}{2M}\pi\right], \quad (1)$$

$$i,j = 1, \ldots, M$$

where $$c(j) = \begin{cases} \sqrt{\frac{1}{M}}, & j = 1 \\ \sqrt{\frac{2}{M}}, & j = 2, \ldots, M, \end{cases} \quad (2)$$

The indices i,j represent the i-th sample of the j-th basis function.

The basis functions for the transform performed by preprocessor 12 and element 30A is defined by $$v_{ij} = h(j)q_{ji} \quad (3)$$

$$= h(j)c(i)\cos\left[\frac{(2j-1)(i-1)}{2M}\pi\right],$$

$$i = 1, \ldots, M$$
$$j = (-K+1), \ldots, M+K$$

$$c(i) = \begin{cases} \sqrt{\frac{1}{M}}, & i = 1 \\ \sqrt{\frac{2}{M}}, & i = 2, \ldots, M, \end{cases} \quad (4)$$

where $v_{ij}$ are the coefficients of the new vectors of the preprocessor transform and $h(j)$ is the direct transform window function.

The basis functions for the transform performed by element 30A and post processor 16 are defined by $$z_{ij} = w(i)q_{ij} \quad (5)$$

$$= w(i)c(j)\cos\left[\frac{(2i-1)(j-1)}{2M}\pi\right]$$

$$i = (-K+1), \ldots, 1, 2, \ldots, M, M+1, \ldots, M+K$$
$$j = 1, 2, \ldots, M$$
where $$c(j) = \begin{cases} \sqrt{\frac{1}{M}}, & j = 1 \\ \sqrt{\frac{2}{M}}, & j = 2, \ldots, M, \end{cases} \quad (6)$$

where $z_{ij}$ are the coefficients of the row vectors of the element 38B/postprocessor 16 transform and $w(i)$ is the window function for the inverse transform. The $z_{ij}$ basis functions are the entries for the matrix that performs the inverse transform, i.e., the reconstruction of the original signal as a linear combination of a set of basis functions.

Each of the $v_{ij}$ functions of the direct transform has length M+2K, but there still are only M functions for a block of size M. Similarly, each of the $z_{ij}$ functions of the inverse transform has length M+2K, but there are still only M functions for a block of size M.

In the present embodiment, for a selected window function $w(i)$, the coefficient of $h(j)$ are uniquely determined since the direct and inverse transforms correspond to two matrices that are the inverse of each other. The coefficinets of the window functions $h(j)$ and $w(i)$ are related by $$h(j) = \frac{w(j)}{1 - 2w(j)} \quad (7)$$

The window functions are determined in the following manner. The window function $w(i)$ has three basic properties in order to optimally reduce blocking effects:

1. $w(i)$ is symmetric, so that the new basis functions $z_{ij}$ are even functions for odd j and odd functions of even j. As a result of this symmetry, the basis functions are approximations to the eigenvectors of the autocovariance matrix of the input signal, like the DCT functions in equation (1).

2. The shifted window functions corresponding to neighboring blocks should in the signal I add up to a predetermined value (e.g., exactly one) for all samples.

3. $w(i)$ is a reasonably smooth function, so that low-frequency basis functions vary slowly, which keeps their correlation coefficient with the high-frequency functions small.

The first two of the above window function properties require that there the only K degrees of freedom in choosing the window coefficients $w(i)$. Given $w(-K+1), w(-K+2), \ldots, w(-1), w(0)$, the following relations are required:

$$w(i) = 1 - w(1-i), i = 1, 2, \ldots, K \quad (8)$$

$$w(i) = 1, i = K+1, K+2, \ldots, M-K \quad (9)$$

$$w(i) = w(M+1-i), i = M-K+1, M-K+2, \ldots, M+K \quad (10)$$

Two exemplary inverse transform window functions satisfying the above properties are $$\text{Linear: } w(i) = \frac{K+i}{2K+1}, i = 1, 2, \ldots, K \quad (11)$$

$$\text{Raised cosine: } w(i) = \frac{1}{2}\left[1 - \cos\left(\frac{i+K}{2K+1}\pi\right)\right], \quad (12)$$

$$i = 1, 2, \ldots, K$$

Figure 4A:
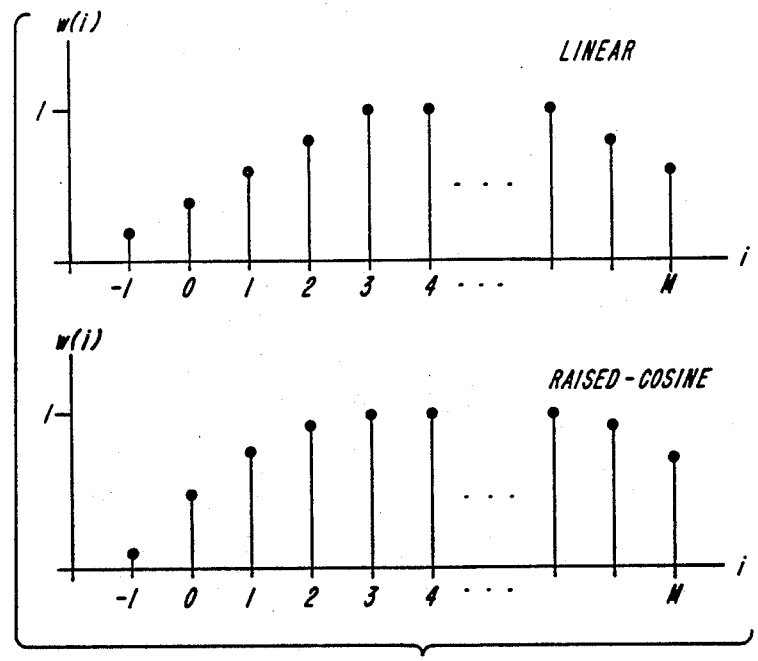
FIG. 4A illustrates two exemplary inverse transform window functions.

Those two exemplary window functions are illustrated in FIG. 4A. The direct transform window function may be determined from equation (7) above.

The direct and inverse transforms defined by the basis functions $z_{ij}$ and $v_{ij}$ are not orthogonal, in the sense that the basis functions do not form an orthogonal set of functions. However, by keeping the amount of overlap K relatively small, and by using a smooth window, the "degree of non-orthogonality" of the $v_{ij}$ and $z_{ij}$ basis functions is maintained small, in the sense that the angle between different functions is kept close to ninety degrees.

Moreover, the transform defined by $v_{ij}$ and $z_{ij}$ leads to an energy distribution among its coefficients that closely approximates that of the DCT which has almost-optimal energy compaction, i.e., the energy of the DCT coefficients is strongly concentrated in the first coefficients. In FIG. 4, the energy distribution of the $v_{ij}-z_{ij}$ transform is compared to that of the DCT, for a first-order Gauss-Markov process with a correlation coefficient of 0.9, and a block size M of 16. The differences are so small that the same coding procedure that is used for the DCT coefficients can be used for the $v_{ij}-z_{ij}$ transform, with an increase in the root-mean-square reconstruction error in the order of only a few tenths of a dB.

The $v_{ij}-z_{ij}$ transform can be efficiently implemented due to its close resemblance to the DCT. Since DCT direct and inverse transform operators are readily available (in hardware or software form), the $v_{ij}-z_{ij}$ transform can make full use of those operators, with the addition of a few butterflies that implement the window.

Figure 5:
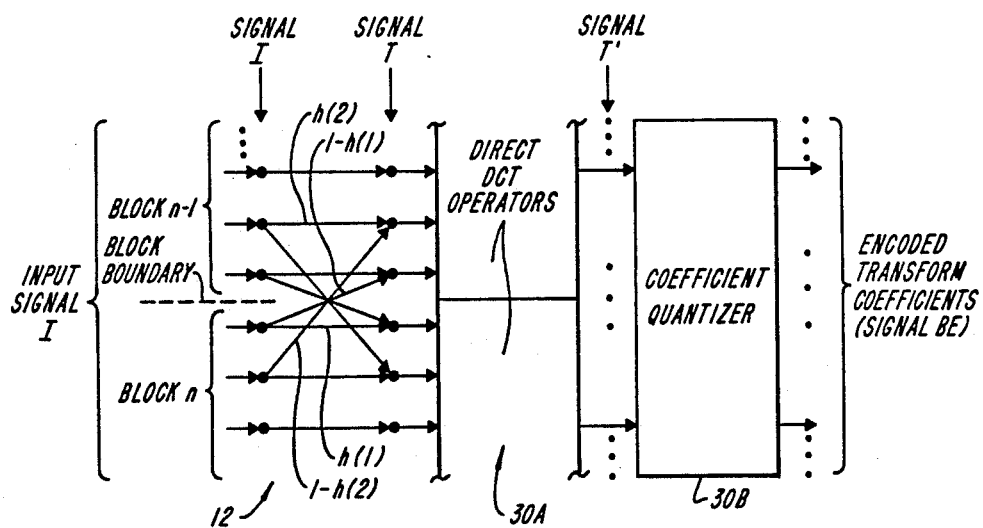
FIG. 5 shows diagramatically an exemplary configuration for the preprocessor and block encoder of the system of FIGS. 1 and 2.
Figure 6:
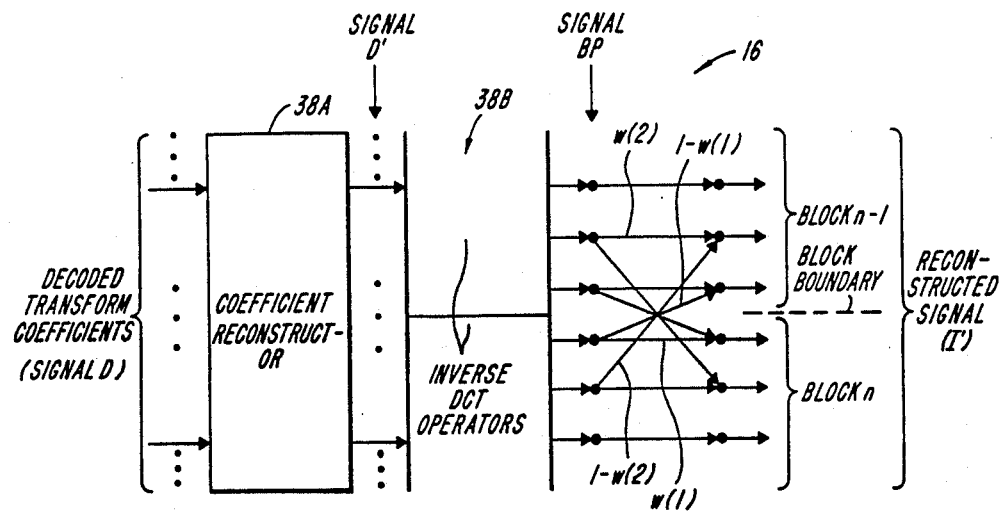
FIG. 6 shows diagramatically an exemplary configuration for the block decoder and postprocessor of the system of FIGS. 1 and 2.
Figure 7:
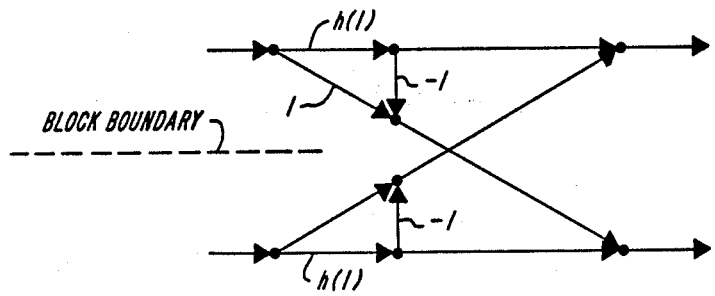
FIG. 7 illustrates, in detailed form, an alternate form for a portion of one of the butterfly diagrams of FIG. 5.
Figure 8:
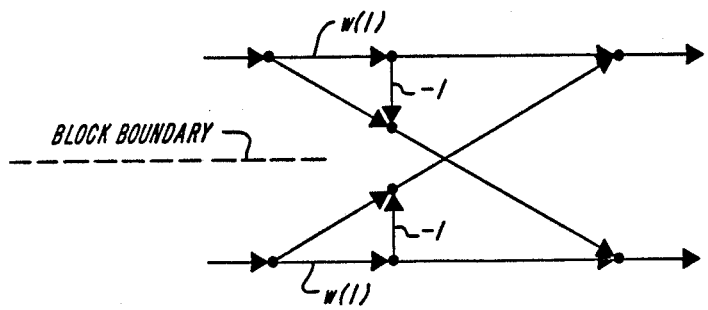
FIG. 8 illustrates, in detailed form, an alternate form for a portion of one of the butterfly diagrams of FIG. 6.

FIGS. 5 and 6 show butterfly diagrams across one block boundary of the signal I defined in the above-described one dimensional example. FIG. 5 shows the composite spatial operator processing performed by preprocessor 12 and block encoder 30 and FIG. 6 shows the composite spatial operator processing performed by block decoder 38 and postprocessor 16. While the butterfly diagrams of FIGS. 5 and 6 show one implementation of the illustrative embodiment, FIGS. 7 and 8 illustrate an alternative implementation of one exemplary butterfly which may be used in place of the butterflies of FIGS. 5 and 6. In FIGS. 7 and 8, the weighted arrows on both sides of the block boundary are the same (i.e., h(1) in FIG. 7 and h(1) in FIG. 8), since the coefficients of the window functions are symmetrical across the block boundaries. In that way, the associated pairs of sample values which are symmetrically disposed about the boundary are combined.

With butterflies of the type shown in FIGS. 7 and 8, the additional computational burden necessary to implement the new transform (compared to conventional DCT/IDCT transforms) is merely 2K multiplications and 4K additions per block. Comparing these numbers with the amount of computation required by the DCT operators, which is given by $(3M/2)(\log M-1)+2$ additions and $M \log M - 3M/2 + 4$ multiplications per block, the $v_{ij} - z_{ij}$ transform leads to a small overhead in the total complexity of the system. For example, for $M=16$ and $K=2$, we need only 10.8% extra additions and 9.1% extra multiplications in order to implement the $v_{ij} - z_{ij}$ transform.

In the presently described exemplary one dimensional embodiment of the invention, with $K=2$ as illustrated in FIGS. 5 and 6, the input signal I may be expressed in terms of an overlapping succession of $1 \times (M+2K)$ matrices of the coefficients of the function I. The preprocessor 12 in that case is a butterfly network modifying the first two and last two coefficients of each of the I matrices, as shown in FIG. 5. The direct transform element 30A is a matrix multiplying apparatus which generates the $1 \times M$ matrix of coefficients for the signal T' (for application to the coefficient quantizer 30B) by multiplying the $1 \times M$ T-matrix by the $M \times M$ DCT-matrix (effectively multiplying a $1 \times (M+2K)$ I-matrix by the $(M+2K) \times M$ $v_{ij}$-matrix). The signal T' may be conventionally processed by quantizer 30B and encoder/transmitter 32 to generate the signal E which is transmitted (via medium 34) to receiver/decoder 36. The receiver/encoder 36 conventionally decodes the received signal E and reconstructs the transform coefficients (signal D'). Signal D' is then applied to element 38B. Element 38B is a matrix multiplying apparatus which multiplies $1 \times M$ D'-matrix by the $M \times M$ IDCT-matrix to generate the $1 \times M$ BP matrix. The butterfly network of postprocessor 16 modifies the first two and last two coefficients of the BP-matrix, as shown in FIG. 6, to generate the $1 \times M$ I'-matrix. In effect, the BP signal is treated as if it was a $1 \times (M+2K)$ signal which is operated on by the butterfly networks to combine two pixel overlapping regions of adjacent blocks in order to obtain the $1 \times M$ signal.

In this exemplary two dimensional example, the coefficients of the V-matrix are the $v_{ij}$ coefficients described above and the coefficients of the Z matrix are the $z_{ij}$ coefficients described above.

Figure 9:
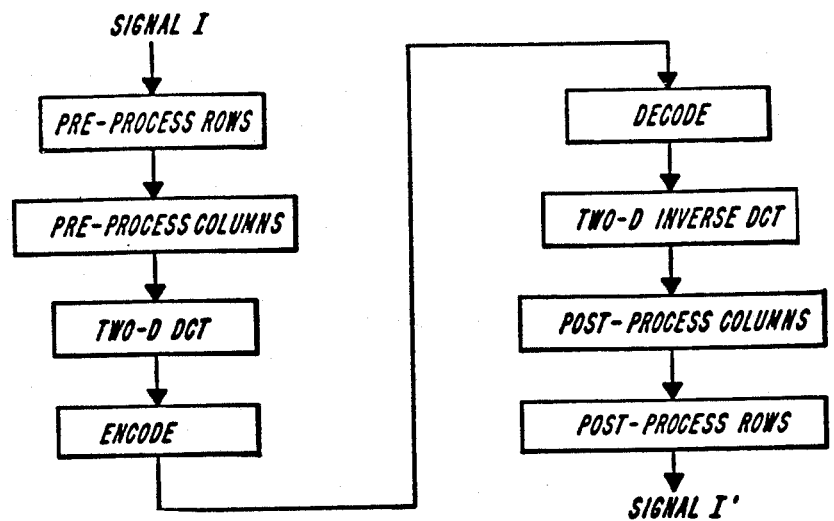
FIG. 9 shows a flow chart illustrating the operation of the invention for a two-dimensional input signal.

The present invention may also be implemented to remove blocking effects in two-dimensional functions, such as images, where blocking effects have posed significant problems in prior art signal processing applications. With such two-dimensional input signals, two-dimensional transforms are used. Such transforms may be readily implemented using the above-described one-dimensional embodiment, for example, by simply processing the rows and columns of each block with the one-dimensional transform in the manner illustrated in the flow chart of FIG. 9. That is, each row and each column of the input signal may be independently preprocessed and postprocessed as in the one-dimensional example. The resultant coefficiently correspond to the block effect-free output signal.

As an example of the implementation of the two-dimensional transform in software, Appendix A includes a listing of a program entitled "Codenew" which performs block coding of a two-dimensional image by using the present invention. The program is written in the PASCAL language, and utilizes the following hardware and supporting software: IBM Personal Computer with 2 disk drives, 512 kilobytes of RAM memory, and a DATACUBE IVG-128 image capture/display board, DOS operating system and TURBO PASCAL compiler. The program can be easily modified to support a different hardware configuration or translated into another high-level language, like FORTRAN or C.

The sections of the program labeled "Pre-filtering" and "Post-filtering" implement the data intermixing butterflies, similar to those shown in FIGS. 5 and 6. With this intermixing, the sample values of associated pairs of the input signal (symmetrically disposed about a block boundary) are linearly combined to obtain the modified sample values. The weighting coefficients for the various combinations for each block are symmetrical across that block. Moreover, the sum of the weighting coefficients for each sample in a block and the weighting coefficients for that sample value in adjacent blocks equals unity.

In summary, the present invention is an improved method and system for block coding of images (or other signals), minimizing blocking effects. The method and system incorporate the following properties:

1. Transforms are performed over input signal blocks which are extended in at least one dimension by K samples, or pixels, in each direction so that there is an overlap of 2K samples between neighboring blocks for each extended dimension. Nevertheless, for a block of size $M \times M$, there are exactly $M \times M$ coefficients, so that minimal data overhead is incurred.

2. All of the basis functions for the transforms of the disclosed embodiments decay smoothly to zero at their boundaries, leading to a strong reduction in the blocking effects.

3. The transform of the invention is near-orthogonal.

4. The invention can be implemented very efficiently, by making use of existing DCT hardware of software, with a few additional butterfly stages. Alternatively, other block processing may be utilized.

5. The invention provides almost the same level of energy compaction as the DCT, so that coding performance is virtually unchanged.

Although the above embodiments are directed principally to a blocking coding, for example in FIGS. 5 and 6, it is clear that the "butterflies" that precede the direct DCT's in FIG. 5 and those following the inverse DCT's in FIG. 6 can be considered as pre- and post-operators by themselves. Therefore, in a more general framework, the DCT and IDCT blocks in FIGS. 5 and 6 may be replaced by any other block-processing operators, such as block filtering, and the butterflies corresponding to the w(i) and h(j) windows can be viewed as pre- and post-filters that intermix (or combine) the data across block boundaries in a way that blocking effects are effectively reduced. Such systems are applicable to any signal processing environment where the amount of data to be processed is large enough to justify block processing, as it is the case for images, speech, geophysics, radar, sonar and others.

Figure 10:
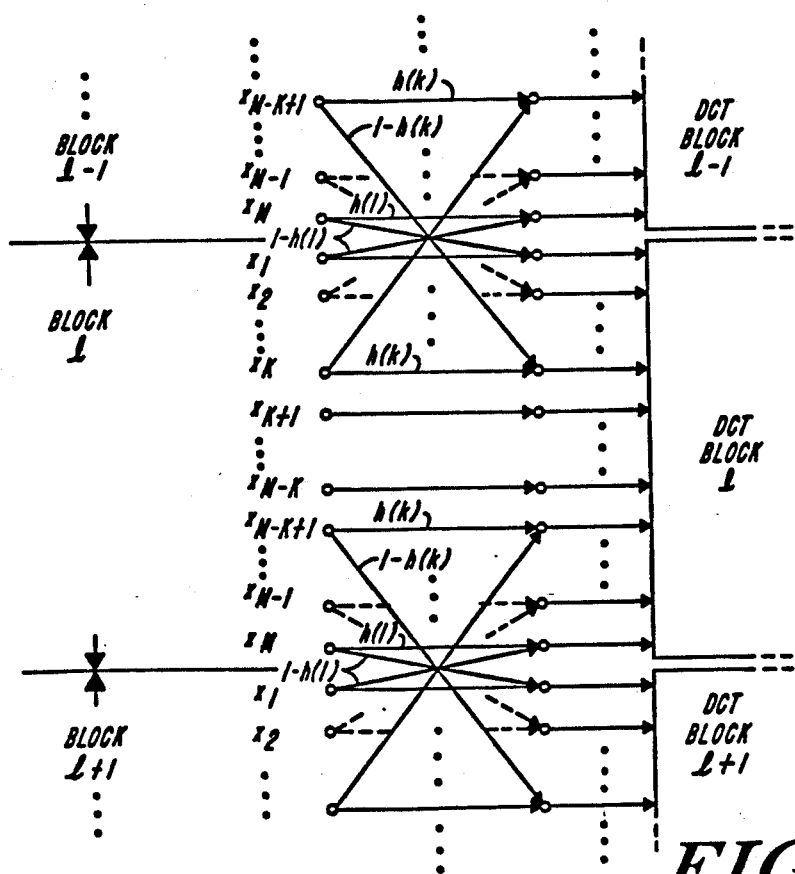
FIG. 10 shows diagramatically another exemplary processing sequence to the block decoder and postprocessor of the system of FIGS. 1 and 2.
Figure 11:
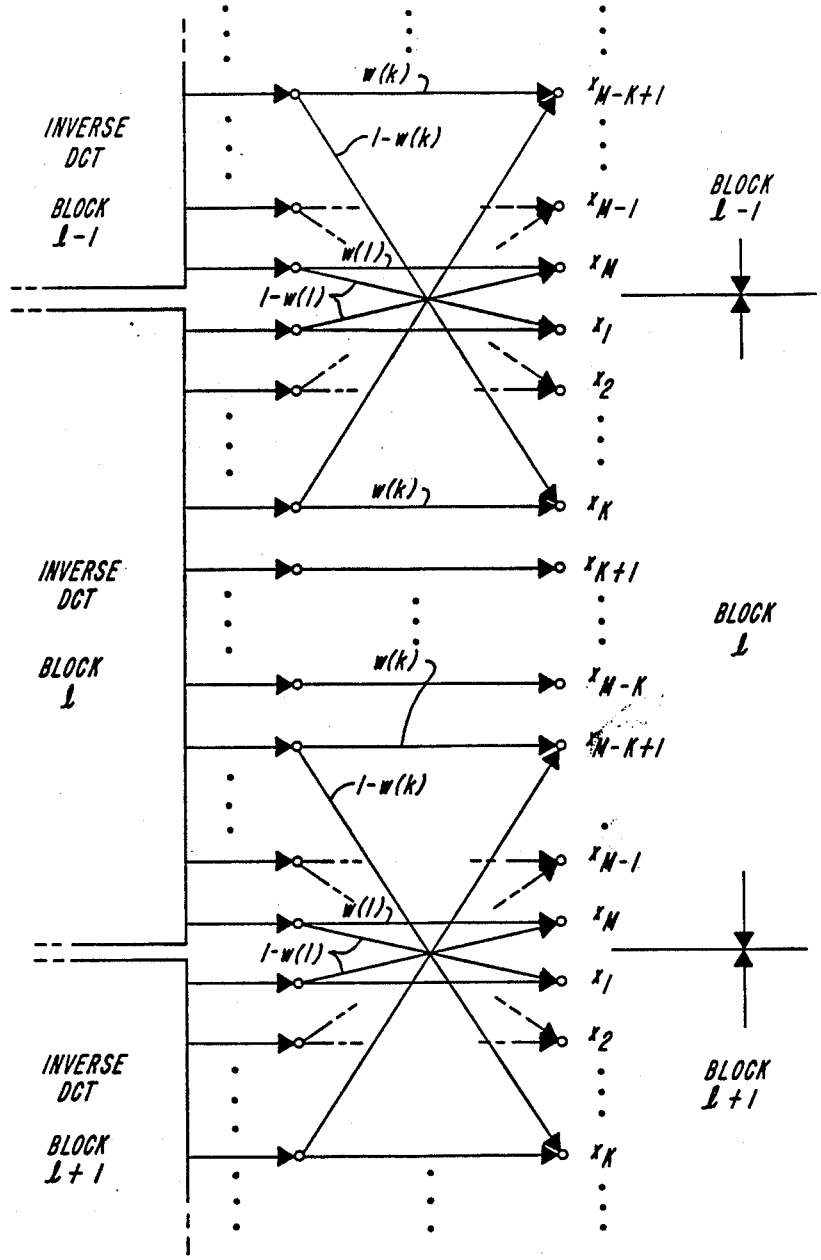
FIG. 11 shows diagramatically another exemplary processing sequence for the preprocessor, and block encoder of the system of FIGS. 1 and 2.

FIGS. 10 and 11 illustrate a more generalized embodiment of the invention in which K is greater than 2, with K data intermixing (or combining) butterflies being shown at the block boundaries for three blocks. In addition, the data across block boundaries may be intermixed to be performed by a more general linear operator than the butterflies depicted in FIGS. 10 and 11, since those butterflies impose a somewhat restrictive way of processing the 2K data points that lie across a block boundary. Accordingly, in keeping with the invention, a general 2K×2K matrix could be used, although there might be an increase in computational overhead.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX A

```
Program Codenew;

{ New transform coding of image }
{ The input image is copied to a 128k-byte buffer starting @
$50000 }
{ The reconstructed image is written to a 256k-byte buffer @
$20000 }
{ Each byte in the input buffer is a pixel. Each word in the
output }
{ buffer is a pixel, with values ranging from -32640 to 32640
(255x128)}
{ Each reconstructed block is added to the buffer.  When the
row counter}
{ is at the third block row, the first row can be
reconstructed, and so on.} const Segment=20532; { =$5000-128,allowing for 4 extra lines}
      Cardsegment=$9000; Recsegment=$2000; ib=$300;
type vecdct=array[0..15] of real;
{$I READIMG.PAS } { Existing subroutine for Loading images}
{$I FDCT16.PAS } { Existing subroutine for Direct DCT}
{$I FIDCT16.PAS } { Existing subroutine for Inverse DCT}
{$I COPYIMG.PAS } { Existing subroutine for Copying images}
{$I Quantize.pas } { Existing subroutine for Quantization }
var x:vecdct;
    pel:array[-4..19,-4..19] of real;
    stdev:array[0..15,0..15] of real;
    bit:array[0..15,0..15] of integer;
    name:string[14];
    datafile:text;
    w,h:array[0..3] of real;
ib1,ib2,i,k,km1,ipel,seg,seg1,cardseg,cardseg1,recseg,j,j2,l,r
,rr,c, lines,ind,indc,indi,indr,indir,indcr,ithr,recseg1,indcl:intege
r;
    sum,h1,h2,w1,w2,dum,dc:real;
    firstpass:boolean;
begin
writeln('***  This is CODENEW.PAS - modified DCT coding
***');
```

```
repeat Readimage(lines); until lines=256;
ClrScr;
writeln('First 3/4 of output buffer is being cleared');
for i:=$2000 to $4fff do
 for k:=0 to 15 do mem[i:k]:=0;
for i:=$6fff-127 to $6fff do
 for k:=0 to 15 do mem[i:k]:=0;
Gotoxy(1,1);writeln('Input image buffer will be written
');
Copyimage(0,256,Segment);
writeln;write('Enter image d.c. value : ');readln(dc);
dc:=16*dc;
writeln;write('Enter variance data file name :
');readln(name);
assign(datafile,name);reset(datafile);
for i:=0 to 15 do
 for j:=0 to 15 do readln(datafile,stdev[i,j]);
writeln;write('Enter bit pattern data file name :
');readln(name);
assign(datafile,name);reset(datafile);
for i:=0 to 15 do
 for j:=0 to 15 do readln(datafile,bit[i,j]);
for i:=0 to 15 do
 for j:=0 to 15 do stdev[i,j]:=sqrt(stdev[i,j]);
Clrscr;

repeat
write('Enter amount of overlap, K : ');
readln(k);
until k in [1..4];
ib1:=-k; ib2:=15+k; km1:=k-1;
{for i:=0 to 3 do begin w[i]:=1; h[i]:=1 end;} for i:=0 to km1 do
 begin
 w[i]:=0.5*(1-cos(pi*(i+1+k)/(2*k+1)));
 h[i]:=w[i]/(2*w[i]-1)
 end;

for r:=0 to 17 do    { loop for all (16+2k)x(16+2k) blocks }
 end;

{ Post-filter rows }
for i:=ib1 to ib2 do
 begin
 for j:=0 to km1 do
  begin
  w1:=w[j]; w2:=1-w1;
  j2:=15-j;
  dum:=pel[i,j];
  pel[i,j]:=w1*dum;
  pel[i,-1-j]:=w2*dum;
  dum:=pel[i,j2];
  pel[i,j2]:=w1*dum;
  pel[i,16+j]:=w2*dum
  end
 end;
```

```
                                          { Return block to output buffer }
    for i:=ib1 to ib2 do
     begin
     recseg1:=recseg+64*i;
     for j:=ib1 to ib2 do
      begin
      indr:=indcr+2*j;
      ipel:=round(100*pel[i,j]);
      memw[recseg1:indr]:=ipel+memw[recseg1:indr];
      end
     end end { column loop}
  end; { if row < 15 } if r > 1 then
 begin
 rr:=r-2;
 recseg:=Recsegment+1024*rr;
 cardseg:=Cardsegment+512*(rr mod 8);
 port[ib]:=4 + rr div 8;
 for c:=0 to 23 do
  begin
  indc:=16*c;
  indcr:=32*c+128;
  Gotoxy(1,7);
  writeln('Reconstructing block ',rr,', ',c,'          ');

for i:=ib1 to ib2 do
   begin
   cardseg1:=cardseg+32*i;
   recseg1:=recseg+64*i;
   for j:=ib1 to ib2 do
 begin
 if r < 16 then
  begin
  seg:=Segment+512*r;
  recseg:=Recsegment+1024*r;
  for c:=0 to 23 do
   begin
   indc:=16*c; indc1:=indc+64;
   indcr:=32*c+128;
   Gotoxy(1,5);
   writeln('Working on block ',r,', ',c,'          ');

{ Remove block from memory }
   for i:=ib1 to ib2 do
    begin
    seg1:=seg+32*i;
    for j:=ib1 to ib2 do pel[i,j]:=mem[Seg1:indc1+j]
    end;

{ Pre-filter rows }
   for i:=ib1 to ib2 do
    begin
    for j:=0 to km1 do
```

```
  begin
  h1:=h[j]; h2:=1-h1;
  j2:=15-j;
  pel[i,j]:=h1*pel[i,j]+h2*pel[i,-1-j];
  pel[i,j2]:=h1*pel[i,j2]+h2*pel[i,16+j]
   end
 end;

{ Pre-filter columns }
for i:=0 to 15 do
 begin
 for j:=0 to km1 do
  begin
  h1:=h[j]; h2:=1-h1;
  j2:=15-j;
  pel[j,i]:=h1*pel[j,i]+h2*pel[-1-j,i];
  pel[j2,i]:=h1*pel[j2,i]+h2*pel[16+j,i]
   end
 end;

{ Compute DCT on rows }
firstpass:=true;
for i:=ib1 to ib2 do
 begin
 for j:=0 to 15 do x[j]:=pel[i,j];
 FDCT16(x,firstpass);
 for j:=0 to 15 do pel[i,j]:=x[j];
 end;
                    { Compute DCT on columns }
for i:=0 to 15 do
 begin
 for j:=0 to 15 do x[j]:=pel[j,i];
 FDCT16(x,firstpass);
  for j:=0 to 15 do pel[j,i]:=x[j];
 end;

{ Quantize }
pel[0,0]:=pel[0,0]-dc;
for i:=0 to 15 do
 for j:=0 to 15 do
  begin
  dum:=pel[i,j];
  quantize(dum,stdev[i,j],bit[i,j]);
  pel[i,j]:=dum
   end;
pel[0,0]:=pel[0,0]+dc;

{ Compute IDCT on columns }
firstpass:=true;
for i:=0 to 15 do
 begin
 for j:=0 to 15 do x[j]:=pel[j,i];
 FIDCT16(x,firstpass);
 for j:=0 to 15 do pel[j,i]:=x[j];
 end;
```

```
                        { Compute IDCT on rows }
for i:=ib1 to ib2 do
 begin
 for j:=0 to 15 do x[j]:=pel[i,j];
 FIDCT16(x,firstpass);
 for j:=0 to 15 do pel[i,j]:=x[j];
 end;

{ Post-filter columns }
for i:=0 to 15 do
 begin
 for j:=0 to km1 do
  begin
  w1:=w[j]; w2:=1-w1;
  j2:=15-j;
  dum:=pel[j,i];
  pel[j,i]:=w1*dum;
  pel[-1-j,i]:=w2*dum;
  dum:=pel[j2,i];
  pel[j2,i]:=w1*dum;
  pel[16+j,i]:=w2*dum
  end
      begin
      ipel:=memw[recseg1:indcr+2*j];
      ipel:=round(ipel/100);
      if ipel < 0 then ipel:=0;
      if ipel > 255 then ipel:=255;
      mem[cardseg1:indc+j]:=ipel
      end
     end
    end
   end;  { if row > 2 }

{ Clear rest of output buffer }
 if r=9 then
  begin
  Gotoxy(1,9);writeln('Clearing last quarter of output
buffer');
   for i:=$5000 to $5fff do
    for k:=0 to 15 do mem[i:k]:=0
  end end {row loop} end.
```

I claim:

1. A method for processing an n-dimensional digitized signal containing at least two adjacent $M_1 \times M_2 \times \ldots \times M_n$ blocks of digitized sample values, where $M_1, M_2, \ldots, M_n$ are integers respectively associated with one of said n dimensions, comprising the steps of:
   transform coding said digitized signal in accordance with a first composite spatial operator to obtain a first transform coded signal, said first composite spatial operator comprising:
      a first spatial transform coding operator characterized by $M_1 \times M_2 \times \ldots \times M_n$ basis functions, where said first spatial transform operator is operative over an n-dimensional peripheral annulus of $(M_1+2K_1) \times (M_2+2K_2) \times \ldots \times (m_n+2K_n)$ blocks of said sample values of said digitized signal, where $K_1, K_2, \ldots, K_n$ are non-negative integers, and at least one of $K_1, K_2, \ldots, K_n$ is non-zero, and a first block processing operator characterized by $M_1 \times M_2 \times \ldots \times M_n$ blocks, said first block processing operator being characterized by $M_1 \times M_2 \times \ldots \times M_n$ basis functions, where said first block processing operator is operative over $M_1 \times M_2 \times \ldots \times M_n$ blocks of said signal values generated by said first spatial transform operator, said first transformed signal being a block processed signal.

2. A method according to claim 1 comprising the further step of:

transforming said first transform coded signal in accordance with a second composite spatial operator to obtain an output transformed signal, said second composite spatial operator including a second block processing operator characterized by $M_1 \times M_2 \times \ldots \times M_n$ blocks.

3. A method according to claim 2 wherein said output transformed signal substantially corresponds to said digitized signal, and said second composite spatial operator being substantially the inverse of said first composite spatial operator.

4. A method according to claim 3 wherein said first block processing operator comprises a discrete cosine transform (DCT) operator and said second composite spatial operator comprises an inverse DCT operator.

5. A method according to claim 3 wherein said first and second composite spatial operators are non-orthogonal.

6. A method according to claim 2 comprising after said first composite spatial operator transform coding step and before said second composite spatial operator transforming step, the further sub-steps of:

encoding said block processed signal to obtain an encoded signal adapted for transmission over a communications medium, transmitting said encoded signal over said medium, receiving said encoded signal and decoding said received encoded signal to re-obtain said block processed signal.

7. A method according to claim 2 wherein said first block processing operator comprises a discrete cosine transform (DCT) operator and said second composite spatial operator comprises an inverse DCT operator.

8. A method according to claim 1 wherein said first block processing operator comprises a discrete cosine transform (DCT) operator.

9. A method according to claim 1 wherein said first composite spatial operator has the form of the product of a window function and a modified discrete cosine transform (DCT) operator, wherein said modified DCT operator being characterized by $M_1 \times M_2 \times \ldots \times M_n$ basis functions operative over $(M_1+2K_1) \times (M_2+2K_2) \times \ldots \times (M_n+2K_n)$ blocks of sample values of said digitized signal, and wherein said window function is an n-dimensional sequence and wherein said window function is symmetrical in each of said n-dimensions, and wherein for each sample value in a block, the sum of the window function for that sample value in that block and the window functions for that sample value in all blocks adjacent to that block is a predetermined value.

10. A method according to claim 1 wherein $n=1$.

11. A method according to claim 1 wherein $n=2$.

12. A method according to claim 1 wherein said transform coding in accordance with said first spatial transform coding operator comprises the step of modifying said sample values by replacing selective ones of said sample values in said blocks with modified sample values, said modified sample values being equal to the combination of pairs of associated sample values symmetrically disposed about the boundaries between adjacent blocks of said digitized signal.

13. A method according to claim 12 wherein said modifying step includes the sub-step of generating weighted linear combinations of said pairs of sample values.

14. A method according to claim 13 wherein for each sample value in a block, the sum of said weighting coefficients for that sample value in that block and the weighting coefficients for that sample value in all blocks adjacent to that block is a predetermined value.

15. A method according to claims 12 or 13 wherein the distribution of weighting coefficients of said combinations for each of said pairs in a block is symmetrical across that block.

16. A method according to claim 15 wherein for each sample value in a block, the sum of said weighting coefficients for that sample value in that block and the weighting coefficients for that sample value in all blocks adjacent to that block is a predetermined value.

17. In a method for processing an n-dimensional digitized signal containing at least two adjacent $M_1 \times M_2 \times \ldots \times M_n$ blocks of digitized sample values, where $M_1, M_2, \ldots, M_n$ are integers respectively associated with one of said n dimensions, including the step of transform coding said digitized signal in accordance with a first block processing operator to obtain a first transform coded signal, said block processing operator being characterized by $M_1 \times M_2 \times \ldots \times M_n$ basis functions, the improvement being the further step of:

controlling said transform coding step whereby said block processing operator is operative over $(M_1+2K_1) \times (M_2+2K_2) \times \ldots \times (M_n+2K_n)$ blocks of said sample values of said digitized signal, where $K_1, K_2, \ldots, K_n$ are non-negative integers, and at least one of $K_1, K_2, \ldots, K_n$ is non-zero, said first transform coded signal being a block processed signal.

18. A method according to claim 17 comprising the further step of:

transforming said block processed signal in accordance with a composite spatial operator to obtain an output transformed signal, said composite spatial operator comprising a second block processing operator characterized by $M_1 \times M_2 \times \ldots \times M_n$ blocks.

19. A method according to claim 18 wherein said first block processing operator comprises a discrete cosine transform (DCT) operator and said second composite spatial operator comprises an inverse DCT operator.

20. A method according to claim 18 wherein said output transformed signal substantially corresponds to said digitized signal, and said composite spatial operator being substantially the inverse of the operator of said controlled transforming step.

21. A method according to claim 20 wherein said first block processing operator comprises a discrete cosine transform (DCT) operator and said composite spatial operator comprises an inverse DCT operator.

22. A method according to claim 18 comprising between said first controlled transform coding step and said composite spatial operator transforming step, the further sub-steps of:
encoding said block processed signal to obtain an encoded signal adapted for transmission over a communications medium, transmitting said encoded signal over said medium,
receiving said encoded signal and decoding said received encoded signal to re-obtain said block processed signal.

23. A method according to claim 17 wherein said first block processing operator comprises a discrete cosine transform (DCT) operator.

24. A method according to claim 17 wherein said controlled transform coding corresponds to a controlled spatial operator having the form of the product of a window function and a modified discrete cosine transform (DCT) operator,
wherein said modified DCT operator being characterized by $M_1 \times M_2 \times \ldots \times M_n$ basis functions operative over $(M_1+2K_1) \times (M_2+2K_2) \times \ldots \times (M_n+2K_n)$ blocks of sample values of said digitized signal, and wherein said window function is an n-dimensional sequence and wherein said window function is symmetrical in each of said n dimensions, and wherein for each sample value in a block, the sum of the window function for that sample value in that block and the window functions for that sample value in all blocks adjacent to that block is a predetermined value.

25. A method according to claim 17 wherein n=1.

26. A method according to claim 17 wherein n=2.

27. A method according to claim 17 wherein said transform coding in accordance with said first block processing operator comprises the step of modifying said sample values by replacing selective ones of said sample values in said blocks with modified sample values, said modified sample values being equal to the combination of pairs of associated sample values symmetrically disposed about the boundaries between adjacent blocks of said digitized signal.

28. A method according to claim 27 wherein said modifying step includes the sub-step of generating weighted linear combinations of said pairs of sample values.

29. A method according to claim 28 wherein for each sample value in a block, the sum of said weighting coefficients for that sample value in that block and the weighting coefficients for that sample value in all blocks adjacent to that block is a predetermined value.

30. A method according to claims 27 or 28 wherein the distribution of weighting coefficients of said combinations for each of said pairs in a block is symmetrical across that block.

31. A method according to claim 30 wherein for each sample value in a block, the sum of said weighting coefficients for that sample value in that block and the weighting coefficients for that sample value in all blocks adjacent to that block is a predetermined value.

32. A method for processing an n-dimensional digitized signal containing at least two adjacent $M_1 \times M_2 \times \ldots \times M_n$ blocks of digitized sample values, where $M_1, M_2, \ldots, M_n$ are integers respectively associated with one of said n dimensions, comprising the sequential steps of:
A. transform coding said digitized signal in accordance with a first spatial transform coding operator to obtain a first transform coded signal, whereby said first tranform coded signal differs from said digitized signal at corresponding sample values contiguous to and including the boundaries of said adjacent blocks, and said first transform coded signal is substantially the same as said digitized signal otherwise, and
B. transforming said first transform coded signal in accordance with a second spatial transform operator to obtain an output transformed signal, whereby said output transformed signal substantially corresponds to said digitized signal, said second spatial transform operator being substantially the inverse of said first spatial transform operator.

33. A method according to claim 32 comprising the further step of block processing said first transform coded signal prior to step B, said block processing being in accordance with a block process characterized by $M_1 \times M_2 \times \ldots \times M_n$ blocks, thereby establishing said first transform coded signal as a block processed signal.

34. A method according to claim 33 wherein said block processing step comprises the sub-steps of:
encoding said block encoded signal to obtain an encoded signal adapted for transmission over a communications medium,
transmitting said encoded signal over said medium,
receiving said encoded signal and decoding said received encoded signal to obtain a decoded signal corresponding to said first transformed signal.

35. A method according to claims 32 or 33 wherein said first and second spatial transform operators are non-orthogonal.

36. A method according to claims 32 or 33 wherein said first spatial transform coding operator is characterized by $M_1 \times M_2 \times \ldots M_n$ basis functions and where said first spatial transform operator is operative over an n dimensional peripheral annulus of $(M_1+2K_1) \times (M_2+2K_2) \times \ldots \times (M_N+2K_n)$ blocks of said sample values of said digitized signal, where $K_1, K_2, \ldots, K_n$ are integers, and at least one of $K_1, K_2, \ldots, K_n$ is non-zero.

37. A method according to claim 36 wherein said first and second spatial transform operators are non-orthogonal.

38. A method according to claim 32 wherein said transform coding in accordance with said first spatial transform coding operator comprises the step of modifying said sample values by replacing selective ones of said sample values in said blocks with modified sample values, said modified sample values being equal to the combination of pairs of associated sample values symmetrically disposed about the boundaries between adjacent blocks of said digitized signal.

39. A method according to claim 38 wherein said modifying step includes the sub-step of generating weighted linear combinations of said pairs of sample values.

40. A method according to claim 39 wherein for each sample value in a block, the sum of said weighting coefficients for that sample value in that block and the weighting coefficients for that sample value in all blocks adjacent to that block is a predetermined value.

41. A method according to claims 38 or 39 wherein the distribution of weighting coefficients of said combinations for each of said pairs in a block is symmetrical across that block.

42. A method according to claim 41 wherein for each sample value in a block, the sum of said weighting coefficients for that sample value in that block and the weighting coefficients for that sample value in all blocks adjacent to that block is a predetermined value.

43. A method for processing an n-dimensional digitized signal containing at least two adjacent $M_1 \times M_2 \times \ldots \times M_n$ blocks of digitized sample values, where $M_1, M_2, \ldots, M_n$ are integers respectively associated with one of said n dimensions, comprising the sequential steps of:
  A. transform coding said digitized signal in accordance with a first spatial transform coding operator to obtain a first transform coded signal, said first spacial transform coding operator being characterized by $M_1 \times M_2 \times \ldots M_n$ basis functions, where said first spatial transform coding operator is operative over an n dimensional peripheral annulus of $(M_1+2K_1) \times (M_2+2K_2) \times \ldots \times (M_n+2K_n)$ blocks of sample values of said digitized signal, where $K_1, K_2, \ldots, K_n$ are integers, and at least one of $K_1, K_2, \ldots, K_n$ is non-zero, and
  B. transforming said transform coded signal in accordance with a second spatial transform operator to obtain an output transformed signal, whereby said output transformed signal substantially corresponds to said digitized signal, and said second spatial transform operator being substantially the inverse of said first spatial transform.

44. A method according to claim 43 comprising the further step of:
  block processing said first transform coded signal prior to step B, said block processing being in accordance with a block process characterized by $M_1 \times M_2 \times \ldots \times M_n$ blocks, thereby establishing said first transform coded signal as a block processed signal.

45. A method according to claim 44 wherein said block processing step comprises the sub-steps of:
  encoding said block encoded signal to obtain an encoded signal adapted for transmission over a communications medium,
  transmitting said encoded signal over said medium,
  receiving said encoded signal and decoding said received encoded signal to obtain a decoded signal corresponding to said first transformed signal.

46. A method according to claims 43 or 44 wherein said first and second spatial transform operators are non-orthogonal.

47. A method according to claim 43 wherein said transform coding in accordance with said first spatial transform coding operator comprises the step of modifying said sample values by replacing selective ones of said sample values in said blocks with modified sample values, said modified sample values being equal to the combination of pairs of associated sample values symmetrically disposed about the boundaries between adjacent blocks of said digitized signal.

48. A method according to claim 47 wherein said modifying step includes the sub-step of generating weighted linear combinations of said pairs of sample values.

49. A method according to claim 48 wherein for each sample value in a block, the sum of said weighting coefficients for that sample value in that block and the weighting coefficients for that sample value in all blocks adjacent to that block is a predetermined value.

50. A method according to claims 47 or 48 wherein the distribution of weighting coefficients of said combinations for each of said pairs in a block is symmetrical across that block.

51. A method according to claim 50 wherein for each sample value in a block, the sum of said weighting coefficients for that sample value in that block and the weighting coefficients for that sample value in all blocks adjacent to that block is a predetermined value.

52. A system for processing an n-dimensional digitized signal containing at least two adjacent $M_1 \times M_2 \times \ldots \times M_n$ blocks of digitized sample values, where $M_1, M_2, \ldots, M_n$ are integers respectively associated with one of said n dimensions, comprising:
  means for transform coding said digitized signal in accordance with a first composite spatial operator to obtain a first transform coded signal, said first composite spatial operator comprising:
  a first spatial transform coding operator characterized by $M_1 \times M_2 \times \ldots \times M_n$ basis functions, where said first spatial transform operator is operative over an n-dimensional peripheral annulus of $(M_1+2K_1) \times (M_2+2K_2) \times \ldots \times (M_n+2K_n)$ blocks of said sample values of said digitized signal, where $K_1, K_2, \ldots, K_n$ are non-negative integers, and at least one of $K_1, K_2, \ldots, K_n$ is non-zero, and
  a first block processing operator characterized by $M_1 \times M_2 \times \ldots \times M_n$ blocks, said first block processing operator being characterized by $M_1 \times M_2 \times \ldots \times M_n$ basis functions, where said first block processing operator is operative over $M_1 \times M_2 \times \ldots \times M_n$ blocks of said signal values generated by said first spatial transform operator, said first transformed signal being a block processed signal.

53. A system according to claim 52 further comprising:
  means for transforming said first transform coded signal in accordance with a second composite spatial operator to obtain an output transformed signal, said second composite signal operator including a second block processing operator characterized by $M_1 \times M_2 \times \ldots \times M_n$ blocks.

54. A system according to claim 53 wherein said output transformed signal substantially corresponds to said digitized signal, and
  said second composite spatial operator being substantially the inverse of said first composite spatial operator.

55. A system according to claim 54 wherein said first block processing operator comprises a discrete cosine transform (DCT) operator and said second composite spatial operator comprises an inverse DCT operator.

56. A system according to claim 54 wherein said first and second composite spatial operators are non-orthogonal.

57. A system according to claim 53 comprising means operative after said means for transform coding in accordance with said first composite spatial operator and before said means for transforming in accordance with said second composite spatial operator for:
  encoding said block processed signal to obtain an encoded signal adapted for transmission over a communications medium,
  transmitting said encoded signal over said medium, receiving said encoded signal and decoding said received encoded signal to re-obtain said block processed signal.

58. A system according to claim 53 wherein said first block processing operator comprises a discrete cosine transform (DCT) operator and said second composite spatial operator comprises an inverse DCT operator.

59. A system according to claim 52 wherein said first block processing operator comprises a discrete cosine transform (DCT) operator.

60. A system according to claim 52 wherein said first composite spatial operator has the form of the product of a window function and a modified discrete cosine transform (DCT) operator, wherein said modified DCT operator being characterized by $M_1 \times M_2 \times \ldots \times M_n$ basis functions operative over $(M_1+2K_1) \times (M_2+2K_2) \times \ldots \times (M_n+2K_n)$ blocks of sample values of said digitized signal, and wherein said window function is an n-dimensional sequence and wherein said window function is symmetrical in each of said n dimensions, and wherein for each sample value in a block, the sum of the window function for that sample value in that block and the window functions for that sample value in all blocks adjacent to that block is a predetermined value.

61. A system according to claim 52 wherein $n=1$.

62. A system according to claim 52 wherein $n=2$.

63. A system according to claim 52 wherein said means for transform coding in accordance with said first spatial transform coding operator comprises means for modifying said sample values by replacing selective ones of said sample values in said blocks with modified sample values, said modified sample values being equal to the combination of pairs of associated sample values symmetrically disposed about the boundaries between adjacent blocks of said digitized signal.

64. A system according to claim 63 wherein said means modifying includes means for generating weighted linear combinations of said pairs of sample values.

65. A system according to claim 64 wherein for each sample value in a block, the sum of said weighting coefficients for that sample value in that block and the weighting coefficients for that sample value in all blocks adjacent to that block is a predetermined value.

66. A system according to claim 63 or 64 wherein the distribution of weighting coefficients of said combinations for each of said pairs in a block is symmetrical across that block.

67. A system according to claim 66 wherein for each sample value in a block, the sum of said weighting coefficients for that sample value in that block and the weighting coefficients for that sample value in all blocks adjacent to that block is a predetermined value.

68. In a system for processing an n-dimensional digitized signal containing at least two adjacent $M_1 \times M_2 \times \ldots \times M_n$ blocks of digitized sample values, where $M_1, M_2, \ldots, M_n$ are integers respectively associated with one of said n dimensions, including means for transform coding said digitized signal in accordance with a first block processing operator to obtain a first transform coded signal, said block processing operator being characterized by $M_1 \times M_2 \times \ldots \times M_n$ basis functions, the improvement including:

means controlling said transform coding step whereby said block processing operator is operative over $(M_1+2K_1) \times (M_2+2K_2) \times \ldots \times (M_n+2K_n)$ blocks of said sample values of said digitized signal, where $K_1, K_2, \ldots, K_n$ are non-negative integers, and at least one of $K_1, K_2, \ldots, K_n$ is non-zero, said first transform coded signal being a block processed signal.

69. A system according to claim 68 further comprising:

means for transforming said block processed signal in accordance with a composite spatial operator to obtain an output transformed signal, said composite spatial operator comprising a second block processing operator characterized by $M_1 \times M_2 \times \ldots \times M_n$ blocks.

70. A system according to claim 69 wherein said output transformed signal substantially corresponds to said digitized signal, and said composite spatial operator being substantially the inverse of the operator of said controlled transforming step.

71. A system according to claim 70 wherein said first block processing operator comprises a discrete cosine transform (DCT) operator and said composite spatial operator comprises an inverse DCT operator.

72. A system according to claim 69 comprising means operative after said controlling means and before said means for transform coding in accordance with composite spatial operator, for:

encoding said block processed signal to obtain an encoded signal adapted for transmission over a communications medium, transmitting said encoded signal over said medium, receiving said encoded signal and decoding said received encoded signal to re-obtain said block processed signal.

73. A system according to claim 69 wherein said first block processing operator comprises a discrete cosine transform (DCT) operator and said second composite spatial operator comprises an inverse DCT operator.

74. A system according to claim 68 wherein said first block processing operator comprises a discrete cosine transform (DCT) operator.

75. A system according to claim 68 wherein said means for controlling said transform coding effects a controlled spatial operator having the form of the product of a window function and a modified discrete cosine transform (DCT) operator, wherein said modified DCT operator being characterized by $M_1 \times M_2 \times \ldots \times M_n$ basis functions operative over $(M_1+2K_1) \times (M_2+2K_2) \times \ldots \times (M_n+2K_n)$ blocks of sample values of said digitized signal, and wherein said window function is an n-dimensional sequence and wherein said window function is symmetrical in each of said n dimensions, and wherein for each sample value in a block, the sum of the window function for that sample value in that block and the window functions for that sample value in all blocks adjacent to that block is a predetermined value.

76. A system according to claim 68 wherein $n=1$.

77. A system according to claim 68 wherein $n=2$.

78. A system according to claim 68 wherein said means for transform coding in accordance with said first block processing transform operator comprises the means for modifying said sample values by replacing selective ones of said sample values in said blocks with modified sample values, said modified sample values being equal to the combination of pairs of associated sample values symmetrically disposed about the boundaries between adjacent blocks of said digitized signal.

79. A system according to claim 78 wherein said modified means includes means for generating weighted linear combinations of said pairs of sample values.

80. A system according to claim 79 wherein for each sample value in a block, the sum of said weighting coefficients for that sample value in that block and the weighting coefficients for that sample value in all blocks adjacent to that block is a predetermined value.

81. A system according to claims 78 or 79 wherein the distribution of weighting coefficients of said combinations for each of said pairs in a block is symmetrical across that block.

82. A system according to claim 81 wherein for each sample value in a block, the sum of said weighting coefficients for that sample value in that block and the weighting coefficients for that sample value in all blocks adjacent to that block is a predetermined value.

83. A system for processing an n-dimensional digitized signal containing at least two adjacent $M_1 \times M_2 \times \ldots \times M_n$ blocks of digitized sample values, where $M_1$, $M_2, \ldots, M_n$ are integers respectively associated with one of said n dimensions, comprising:
  A. means for transform coding said digitized signal in accordance with a first spatial transform coding operator to obtain a first transform coded signal, whereby said first transform coded signal differs from said digitized signal at corresponding sample values contiguous to and including the boundaries of said adjacent blocks, and said first transform coded signal is substantially the same as said digitized signal otherwise, and
  B. means for transform coding said first transformed signal in accordance with a second spatial transform operator to obtain an output transformed signal, whereby said output transformed signal substantially corresponds to said digitized signal, said second spatial transform operator being substantially the inverse of said first spatial transform operator.

84. A system according to claim 83 comprising the further means for block processing said first transform coded signal prior to the operation of said means for transforming in accordance with said second spatial operator, said block processing being in accordance with a block process characterized by $M_1 \times M_2 \times \ldots \times M_n$ blocks, thereby establishing said first transform coded signal as a block processed signal.

85. A system according to claim 84 wherein said block processing means comprises means for:
  encoding said block encoded signal to obtain an encoded signal adapted for transmission over a communications medium,
  transmitting said encoded signal over said medium,
  receiving said encoded signal and decoding said received encoded signal to obtain a decoded signal corresponding to said first transformed signal.

86. A system according to claims 83 or 84 wherein said first spatial transform coding operator is characterized by $M_1 \times M_2 \times \ldots M_n$ basis functions and where said first spatial transform operator is operative over an n dimensional peripheral annulus of $(M_1+2K_1) \times (M_2+2K_2) \times \ldots \times (M_N+2K_n)$ blocks of said sample values of said digitized signal, where $K_1$, $K_2, \ldots, K_n$ are integers, and at least one of $K_1, K_2, \ldots, K_n$ is non-zero.

87. A system according to claim 86 wherein said first and second spatial transform operators are non-orthogonal.

88. A system according to claims 83 or 84 wherein said first and second spatial transform operators are non-orthogonal.

89. A system according to claim 83 wherein said means for transform coding in accordance with said first spatial transform coding operator comprises means for modifying said sample values by replacing selective ones of said sample values in said blocks with modified sample values, said modified sample values being equal to the combination of pairs of associated sample values symmetrically disposed about the boundaries between adjacent blocks of said digitized signal.

90. A system according to claim 89 wherein said modifying means includes means for generating weighted linear combinations of said pairs of sample values.

91. A system according to claim 90 wherein for each sample value in a block, the sum of said weighting coefficients for that sample value in that block and the weighting coefficients for that sample value in all blocks adjacent to that block is a predetermined value.

92. A system according to claims 89 or 90 wherein the distribution of weighting coefficients of said combinations for each of said pairs in a block is symmetrical across that block.

93. A system according to claim 92 wherein for each sample value in a block, the sum of said weighting coefficients for that sample value in that block and the weighting coefficients for that sample value in all blocks adjacent to that block is a predetermined value.

94. A system for processing an n-dimensional digitized signal containing at least two adjacent $M_1 \times M_2 \times \ldots \times M_n$ blocks of digitized sample values, where $M_1$, $M_2, \ldots, M_n$ are integers respectively associated with one of said n dimensions, comprising the sequential steps of:
  A. means for transform coding said digitized signal in accordance with a first spatial transform coding operator to obtain a first transform coded signal, and first spatial transform coding operator being characterized by $M_1 \times M_2 \times \ldots M_n$ basis functions, where said first spatial transform operator is operative over an n dimensional peripheral annulus of $(M_1+2K_1) \times (M_2+2K_2) \times \ldots \times (M_n+2K_n)$ blocks of sample values of said digitized signal, where $K_1$, $K_2, \ldots, K_n$ are integers, and at least one of $K_1, K_2, \ldots, K_n$ is non-zero, and
  B. means for transforming said transform coded signal in accordance with a second spatial transform operator to obtain an output transformed signal, whereby said output transformed signal substantially corresponds to said digitized signal, and
  said second spatial transform operator being substantially the inverse of said first spatial transform.

95. A system according to claim 94 further comprising:
  means for block processing said first transformed signal prior to operation of said means for transforming in accordance with said second spatial operator, said block processing being in accordance with a block process characterized by $M_1 \times M_2 \times \ldots \times M_n$ blocks, thereby establishing said first transformed signal as a block processed signal.

96. A system according to claim 95 wherein said block processing means comprises means for:

encoding said block encoded signal to obtain an encoded signal adapted for transmission over a communications medium, transmitting said encoded signal over said medium, receiving said encoded signal and decoding said received encoded signal to obtain a decoded signal corresponding to said first transformed signal.

97. A system according to claim 94 or 95 wherein said first and second spatial transform operators are non-orthogonal.

98. A system according to claim 94 wherein said means for transform coding in accordance with said first spatial transform coding operator comprises the means for modifying said sample values by replacing selective ones of said sample values in said blocks with modified sample values, said modified sample values being equal to the combination of pairs of associated sample values symmetrically disposed about the boundaries between adjacent blocks of said digitized signal.

99. A system according to claim 98 wherein said modifying means includes means for generating weighted linear combinations of said pairs of sample values.

100. A system according to claim 99 wherein for each sample value in a block, the sum of said weighting coefficients for that sample value in that block and the weighting coefficients for that sample value in all blocks adjacent to that block is a predetermined value.

101. A system according to claims 98 or 99 wherein the distribution of weighting coefficients of said combinations for each of said pairs in a block is symmetrical across that block.

102. A system according to claim 101 wherein for each sample value in a block, the sum of said weighting coefficients for that sample value in that block and the weighting coefficients for that sample value on all blocks adjacent to that block is a predetermined value.

* * * * *